(12) United States Patent
Longbrake (10) Patent No.: US 6,701,827 B1
(45) Date of Patent: Mar. 9, 2004

(54) ROTARY FOOD COOKING APPARATUS (75) Inventor: James R. Longbrake, DeGraff, OH (US)

(73) Assignee: Wieneround, Ltd., DeGraff, OH (US)

( * ) Notice: Subject to any disclaimer, the term of this patent is extended or adjusted under 35 U.S.C. 154(b) by 0 days.

(21) Appl. No.: 10/116,349

(22) Filed: Apr. 4, 2002

(51) Int. Cl.$^7$ .................................................. A47J 43/18
(52) U.S. Cl. ............................ 99/441; 99/394; 294/1.1
(58) Field of Search .......................... 294/1.1, 7, 8, 61, 294/26, 55.5; 99/394, 395, 421 A, 421 R, 426, 427, 441

(56) References Cited

U.S. PATENT DOCUMENTS

| | | | |
|---|---|---|---|
| 2,041,369 A | 3/1936 | Pickett | 366/130 |
| 2,189,047 A | 2/1940 | Tolen | 99/441 |
| 2,535,548 A | 12/1950 | Porter | 99/421 A |
| D161,756 S | 1/1951 | Hunter | D7/683 |
| 2,649,042 A | 8/1953 | Wickman | 99/441 |
| 2,804,819 A | 9/1957 | Whealton | 99/441 |
| 3,628,819 A | 12/1971 | Fowler | 294/50 |
| 3,927,609 A | 12/1975 | Scott | 99/419 |
| 3,946,653 A | 3/1976 | Pugh | 99/340 |
| D244,903 S | 7/1977 | Hildebrand | D7/683 |
| 4,355,569 A | 10/1982 | Sage | 99/427 |
| 4,370,920 A | 2/1983 | Henriques et al. | 99/339 |
| 4,380,192 A | 4/1983 | Doren | 99/441 |
| 4,446,777 A | 5/1984 | Grigorenko | |
| 4,517,885 A | 5/1985 | Thompson | 99/421 HV |
| 4,555,986 A | 12/1985 | Eisenberg | 99/427 |
| 4,612,851 A | 9/1986 | McManus | 99/419 |
| 4,982,657 A | 1/1991 | Ghenic | 99/421 A |
| 5,355,778 A | 10/1994 | Mayfield et al. | 99/441 |
| D361,699 S | 8/1995 | McHugh | D7/683 |
| D377,888 S | 2/1997 | Griffin | D7/683 |
| 5,628,244 A | 5/1997 | Holliday | 99/421 A |
| 6,085,642 A | 7/2000 | Terry | 99/421 A |

Primary Examiner—Dean J. Kramer
(74) Attorney, Agent, or Firm—Standley Law Group LLP (57) ABSTRACT During camping trips, picnics, or other similar outings, a food, such as a hot dog or wiener, can be cooked over an open fire. Instead of a typical sharpened stick or fork being used to hold the hot dog over the fire, the device described provides rotary placement of a food being roasted over an open heat source such as a campfire. The apparatus is a durable and easy to use food cooker that facilitates the uniform cooking of a food. Food such as hot dogs, wieners, sausages, and ears of corn may be readily placed into the cooking apparatus and roasted over an open fire. The device is adaptable for holding other food items, such as marshmallows, by the use of an accessory holder.

20 Claims, 8 Drawing Sheets

ROTARY FOOD COOKING APPARATUS

BACKGROUND AND SUMMARY OF THE INVENTION

The present invention relates to an apparatus providing rotary placement of a food to be cooked over an exposed heat source.

During camping trips, picnics, or other outings a food, such as hot dogs or wieners, can be cooked over an open fire. Typically, a sharpened stick or fork is used to hold the hot dog over the fire. Such devices are awkward to handle and inherently dangerous in that a sharp object is being handled. It is difficult to evenly cook a hot dog or sausage over an open flame as the stick or fork must be fully manipulated to get even heating of the food. Some of the disadvantages arising from the use of a stick or a fork are that the food sometimes falls from the stick during the cooking, or brushes against the logs or the ground thus contaminating the food. In piercing the skin of a hot dog, there is a loss of juices that degrade the taste of the cooked product. With a single stick or a fork, it is hard to cook two or more hot dogs at the same time.

The present invention provides a durable and effective implement for roasting food over an open heat source such as a campfire.

The present invention provides a food handling apparatus that is convenient to use, facilitates uniform cooking, avoids the direct handling of hot food freshly cooked over a heat source and avoids contact with the heated end of the cooking implement. The food may be completely and evenly exposed to the heat of a fire or other exposed heat source with minimal risk of loss of the food from the apparatus of the present invention, but the food is still easily removable from the device after the cooking is completed.

A user may maintain the food over a fire at a comfortable distance. In addition, the food is slowly rotated to expose it completely and substantially evenly to the heat. The present invention is easy to operate by users young and old. When rotated, the entire surface of the food is subjected to the heat of the fire to provide for even heating. The food may be manually rotated on a substantially continuous basis or alternatively, the food may be rotated intermittently during the cooking operation.

The food, such as a hot dog, is supported safely over a fire in a holder portion of the apparatus that does not puncture the skin of the hot dog. Juices do not come out, nor are there the negative effects of the wiener breaking, splitting and falling into the fire or the dirt.

In addition to the novel features and advantages mentioned above, other objects and advantages of the present invention will be readily apparent from the following descriptions of the drawings and preferred embodiments.

DETAILED DESCRIPTION OF THE EXEMPLARY EMBODIMENT(S)

Figure 1:
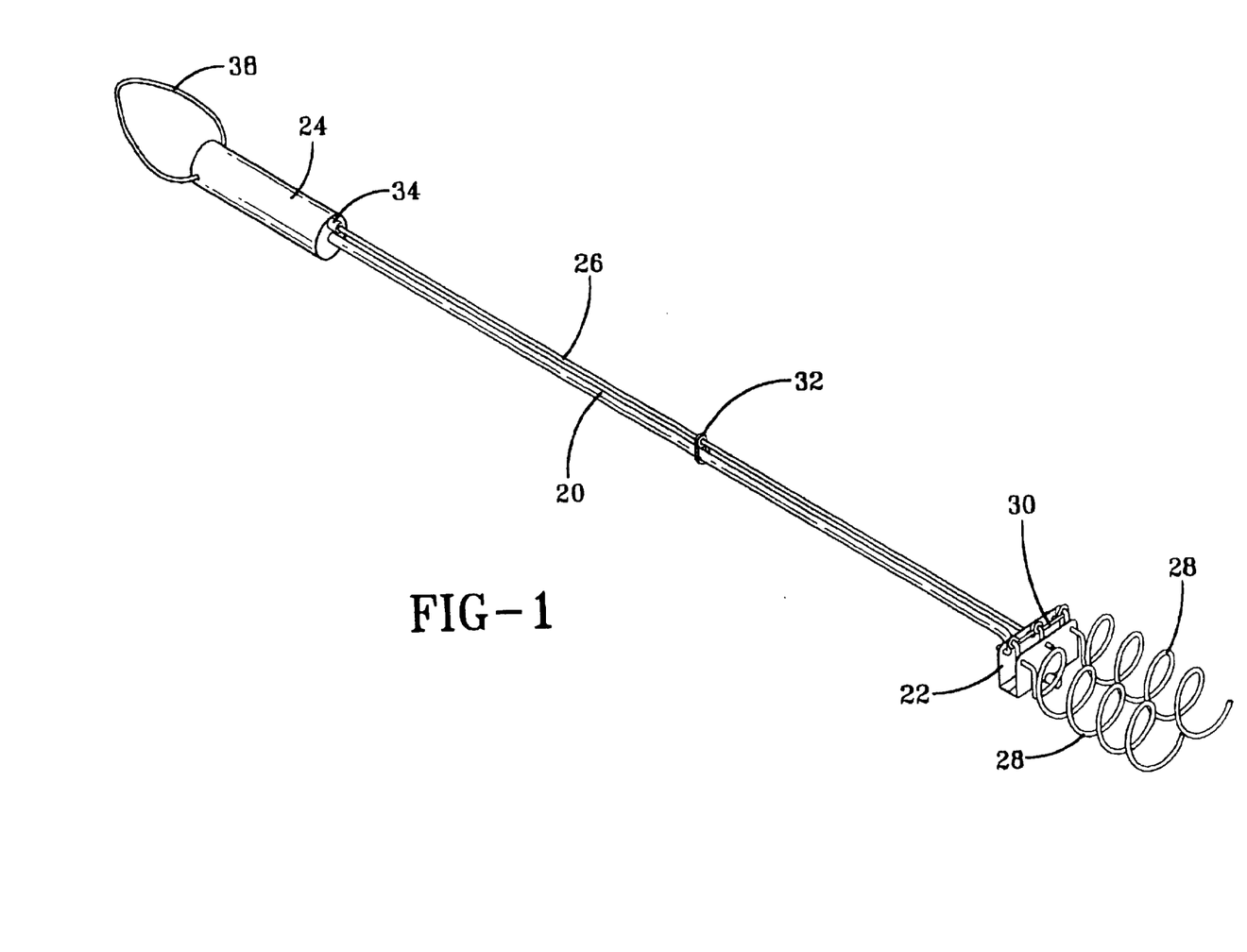
FIG. 1 is a perspective view of an embodiment of the present invention.
Figure 11:
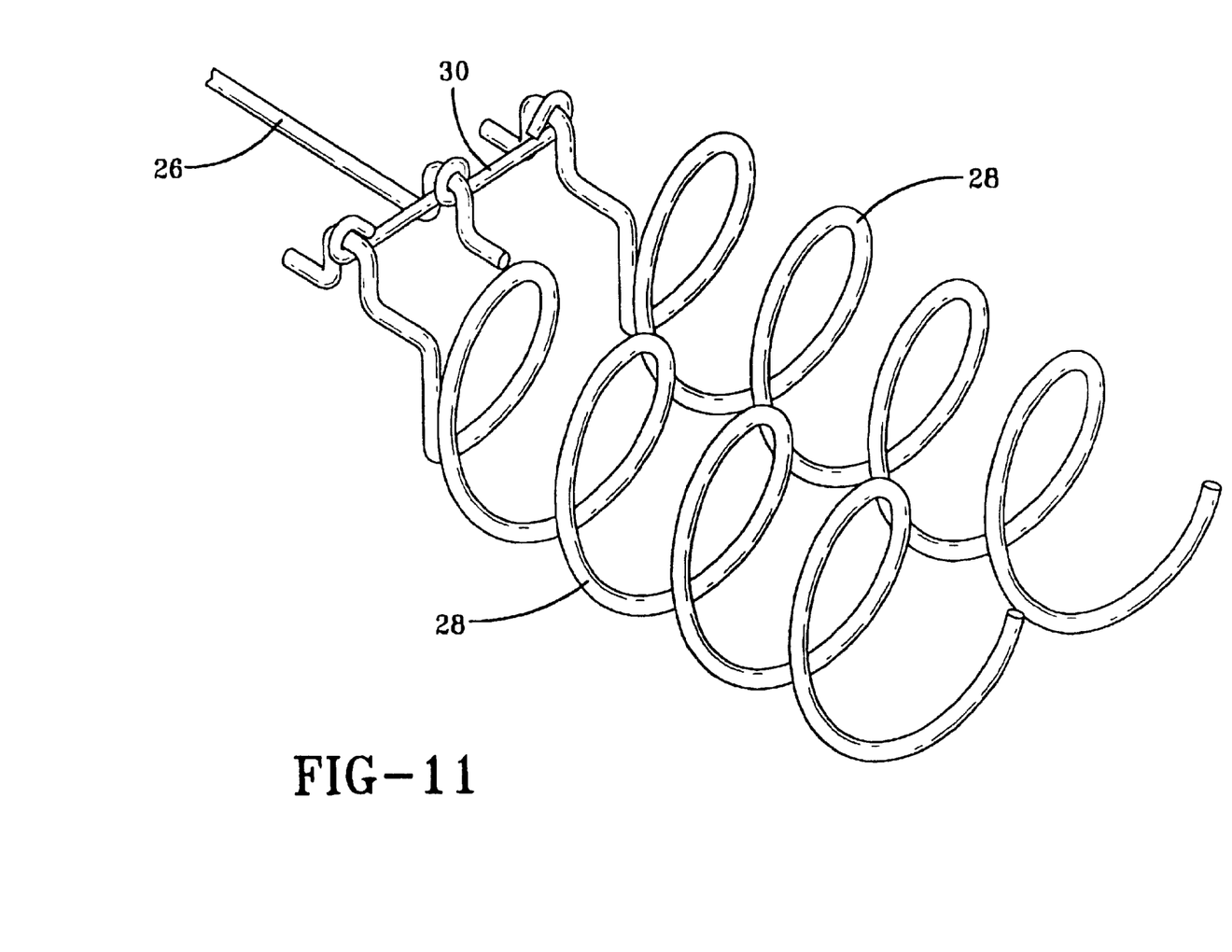
FIG. 11 is a perspective view of an embodiment of the present invention.
Figure 12:
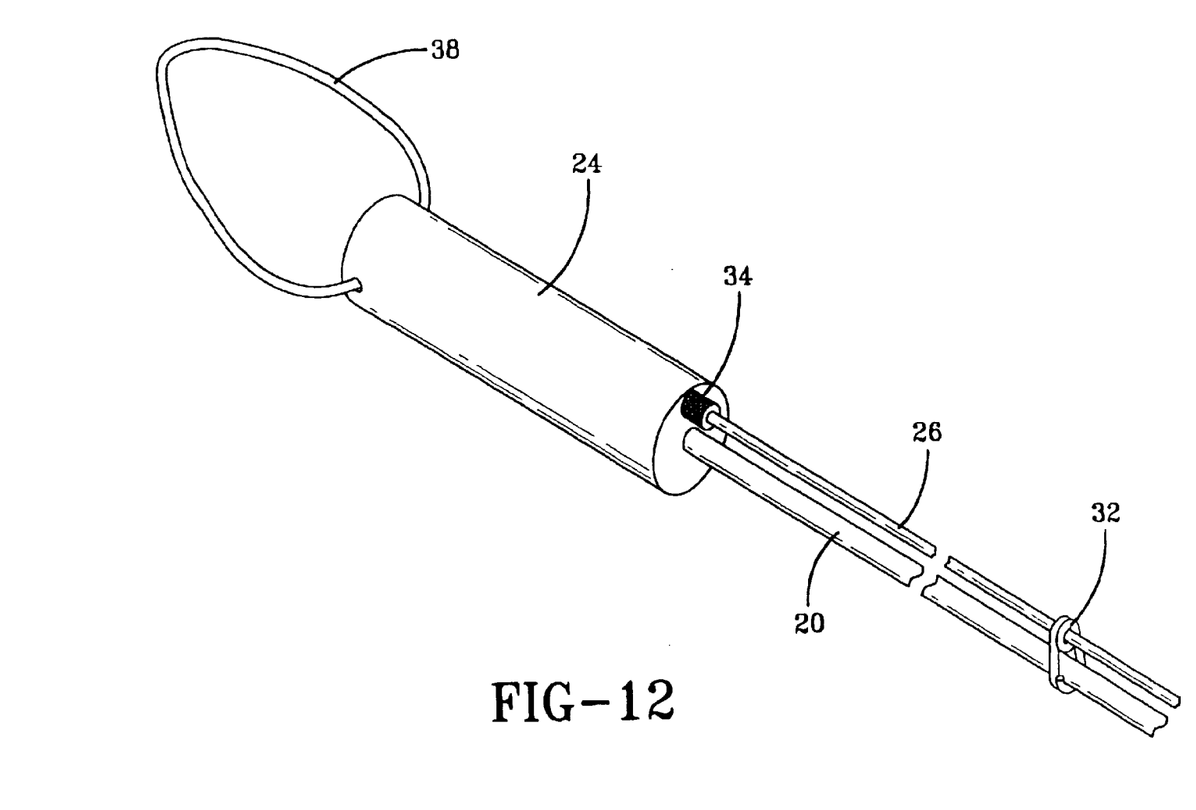
FIG. 12 is a perspective view of a portion of an embodiment of the present invention.
Figure 13:
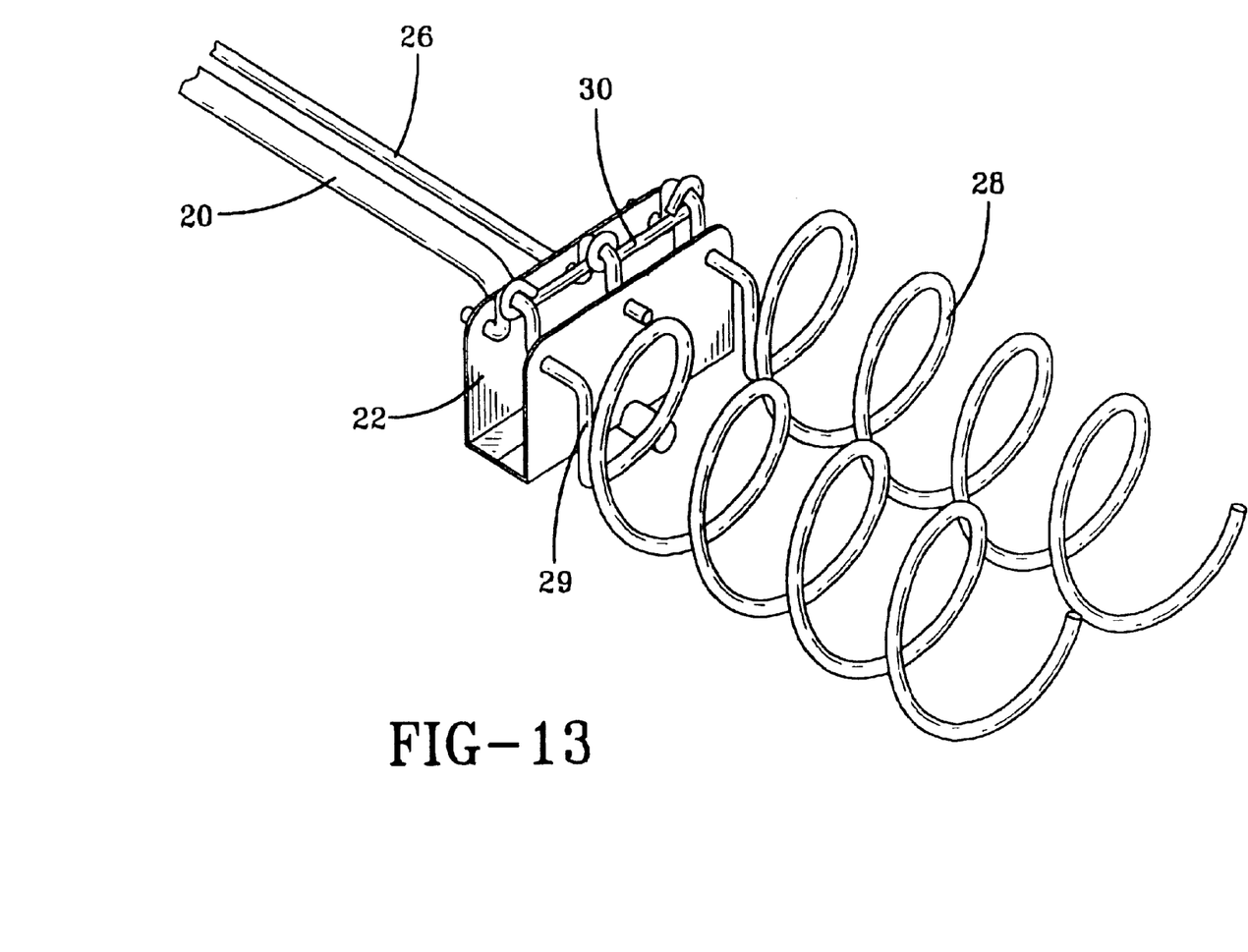
FIG. 13 is a perspective view of a portion of an embodiment of the present invention.

The present invention relates to an apparatus providing rotary placement of a food to be cooked over an exposed heat source. FIGS. 1 and 11 show perspective views of an embodiment of the present invention. FIGS. 12 and 13 show perspective views of a portion of an embodiment of the present invention, allowing the presentation of closer detail than can be seen in FIGS. 1 and 11. As can be observed, the present invention is shown having a main shaft 20 fixably connected to a handle 24 and a support channel 22. The main shaft 20 is to be of a length adequate to allow a user to stand comfortably away from an open heat source, such as a camp fire, while cooking a food held in the coils 28 over the open heat source.

The drive shaft 26 is operatively connected to the handle 24 and the support channel 22. As shown, the drive shaft 26 runs parallel to and is approximately the same length as the main shaft 20. In addition, the operative connection of the drive shaft 26 to the handle 24 and the support channel 22 allows the drive shaft 26 to rotate. Such rotation of the drive shaft 26 may be induced by a force applied directly to the drive shaft 26, or as shown, by the thumb wheel 34. In the example shown, the thumb wheel 34 is secured to the drive shaft 26 by a set screw. Other means, such as installing the thumb wheel 34 into operational attachment to the handle 24 then operationally coupling the thumb wheel 34 and the drive shaft 26 still yield the desired ability to cause the drive shaft 26 to rotate with the rotation of the thumb wheel 34. Although not shown in the present embodiment, a rotational force may be easily applied to the drive shaft 26 by a knob, a crank handle, trigger, or an electric motor.

Figure 3A:
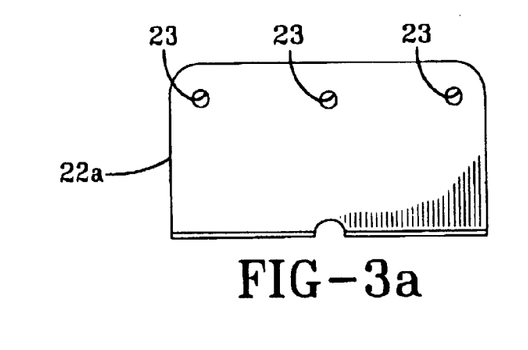
FIGS. 3a, 3b, and 3c are front, bottom, and side views, respectively, of an embodiment of the support channel of the present invention.

FIG. 13 shows in greater detail the operative connection at the support channel 22 of an example embodiment of the present invention that is also shown in FIGS. 1 and 11. In FIG. 13, the first end of the main shaft 20 is shown fixably connected to the support channel 22. Also in FIG. 13, the first end of the drive shaft 26 and the first ends of two coils 28 are shown in operative connection with the support channel 22. As can be seen in greater detail in FIG. 3a, showing a representation of one-half of the member 22a forming the support channel 22, the holes 23 allow for the insertion of the first ends of the drive shaft 26 and the coils 28 into a support channel 22 formed by the combination of two members 22a. The holes 23 shown in the member 22a provide alignment and support of the first ends of the drive shaft 26 and the coils 28. When a pair of members 22a are assembled with the first ends of the drive shaft 26 and the coils 28, the complementary set of holes 23 on the opposing member 22a from which a first end of either the drive shaft 26 or the coils 28 are inserted provides additional alignment and support.

As illustrated in FIG. 13, within the support channel 22 the first ends of the drive shaft 26 and the coils 28 are operatively interconnected by the drive link 30 as a means of transferring a rotational force from the drive shaft 26 to the coils 28. In the example embodiment, the first ends of the drive shaft 26 and the coils 28 are bent to form cranks that are interconnected by the drive link. 30 for the transfer of the rotational motion from the drive shaft 26 to the coils 28. In the example embodiment, as the thumb wheel 34 is rotated clockwise, the drive shaft 26 turns clockwise, thusly transferring a clockwise rotation to the coils 28. Although not shown in this embodiment, the present invention may include the use of other means for transferring the, rotational force from the drive shaft 26 to the coils 28. Such means include at least one gear, a chain, a sprocket, a cam, a bent shaft, a straight shaft, a crankshaft, a belt, a transmission, or any combination thereof to translate the rotational forces. Although only two coils 28 are shown on the example embodiment of the present invention, the present invention allows for the accommodation of single coil or multiple coil 28 arrangements, the rotation of such multiple coils is facilitated by the means of translation of rotational forces described above.

FIGS. 1, 11, and 12, show the guide loop 32 fixably connected to the main shaft 20. The guide loop 32 provides support and helps to maintain the alignment of the drive shaft 26 with the handle 24 and the support channel 22. For the example embodiment, the support provided by the guide loop 32 facilitates the transfer of the rotational force from the thumb wheel 34 through the apparatus to the coils 28 by maintaining a desired mechanical alignment. Although not shown in the example embodiment, the guide loop may be substituted for any means of supporting the drive shaft 26 over its run from the handle 24 to the support channel 22. Means of support for the drive shaft 26, in addition to the guide loop, include use of a bearing or a collar mounted to the main shaft 20.

FIGS. 1, 11, and 13, show an embodiment of the coils 28 of the present invention. The coils 28 are shown with a clockwise spiral defining a first inner diameter sized to receive the food to be cooked over the open heat source. It is not required for the first inner diameter to match or even snugly fit the food received within the opening of the coils 28 since in the operation of the example embodiment shown in FIGS. 1, 11, 12, and 13, the coils will rotate in a clockwise direction upon a clockwise rotation of the thumb wheel 34. The clockwise rotation of the clockwise spiral of the coils 28 will provide a preferential force upon the food that is directed toward the first end of the coils 28 (back toward the support channel 22). As shown in the example embodiment at FIG. 13, a food stop 29 will prevent the food from passing through and out of the coil. The food stop 29 may take many forms and may be replaced or supplemented with a spiral in the coil forming a second inner diameter near the first end of the coil 28. The second inner diameter is less than the first inner diameter, as well as adequately sized, such that the food is prevented from passing through and out of the first end of the coils 28. In any of the embodiments, the force back to the first end of the coils will serve to maintain the food within the coils 28 during the rotating and cooking process. In this example, the cooked food may be removed by tilting the apparatus sufficiently forward (i.e., down) to allow the food to fall out of the coil 28 or to be pulled out by a smaller utensil, such as a table fork.

As shown in FIGS. 1, 11, and 12, an embodiment of the present invention may include a wrist strap 38 attached to the handle 24 for uses such as carrying the apparatus or to prevent loss of the apparatus into an open heat source such as a campfire.

Although not shown in the figures, the coils 28 of the present invention may also be formed with a counterclockwise spiral forming a first inside diameter. In addition the coils 28 may have, at a second end (away from the support channel 22), either a food stop or a spiral forming a second inside diameter smaller than the first inside diameter. In this embodiment, the food inserted into the coils 28 is preferentially forced toward the second end of the coils 28 during the clockwise rotation of the thumb wheel 34 or the drive shaft 26 translating into a clockwise rotation of the coils 28. This embodiment is resistant to food inadvertently dropping out of the coils 28 due to gravity in the event that a user lowered the "coil-end" of the apparatus relative to the handle 24 since the food stop or the smaller second inside diameter prevents the food from traversing through the second end of the coils 28.

Figure 2:
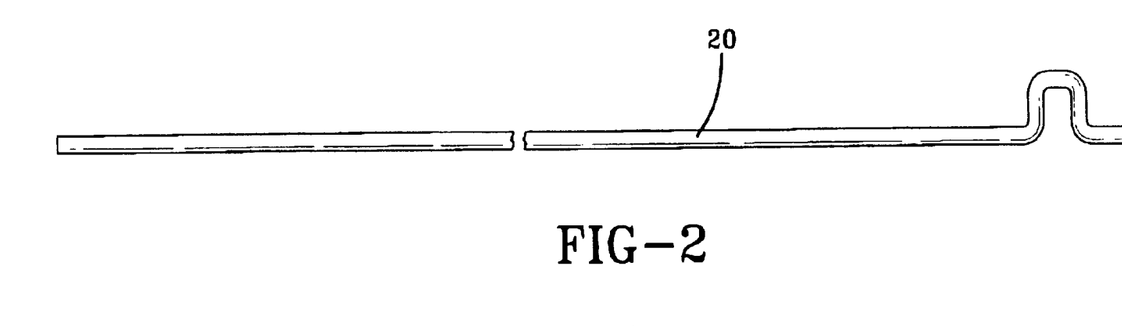
FIG. 2 is a side view of an embodiment of the main shaft of the present invention.
Figure 3B:
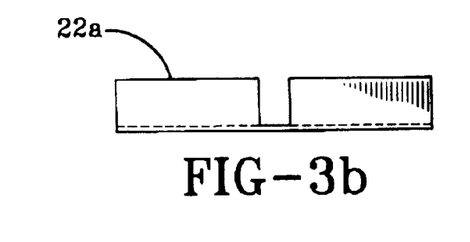
Figure 3C:
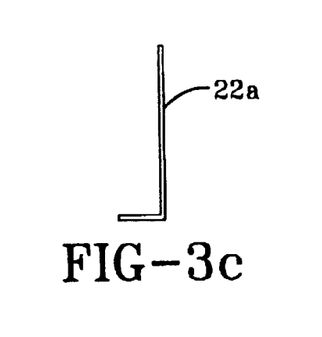
Figure 4A:
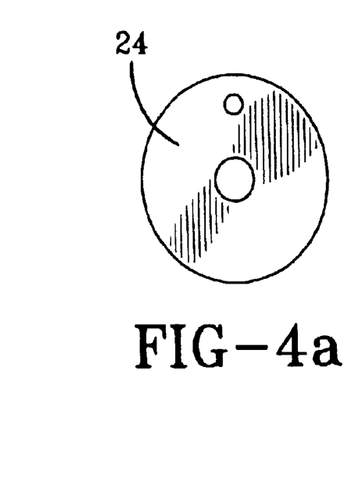
FIGS. 4a and 4b are front and side views, respectively, of an embodiment of the handle of the present invention.
Figure 4B:
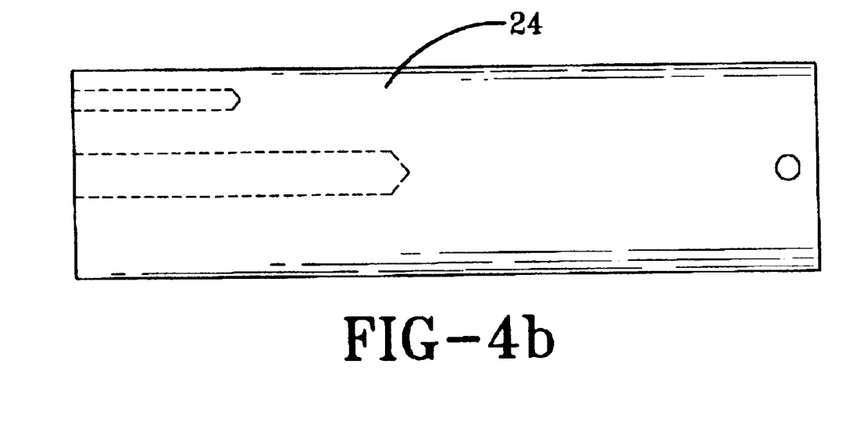
Figure 5:
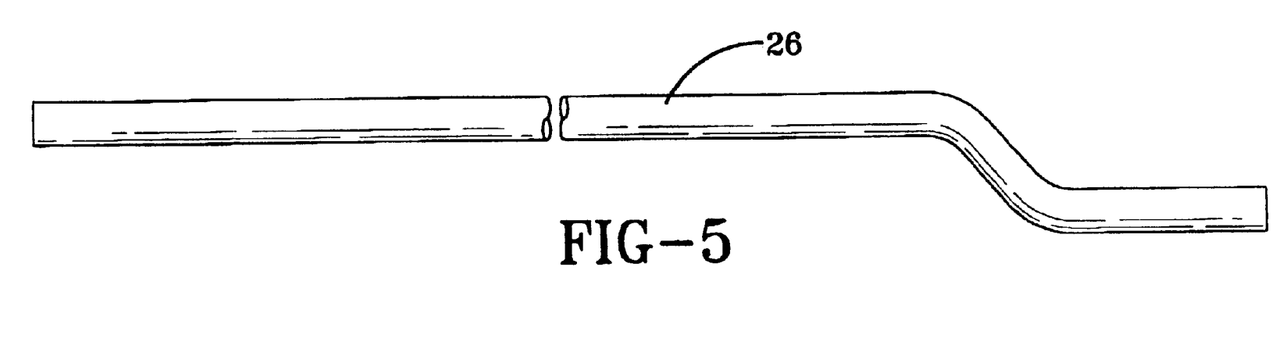
FIG. 5 is a side view of an embodiment of the drive shaft of the present invention.
Figures 6, 7, 8A, 8B, 9A, 9B:
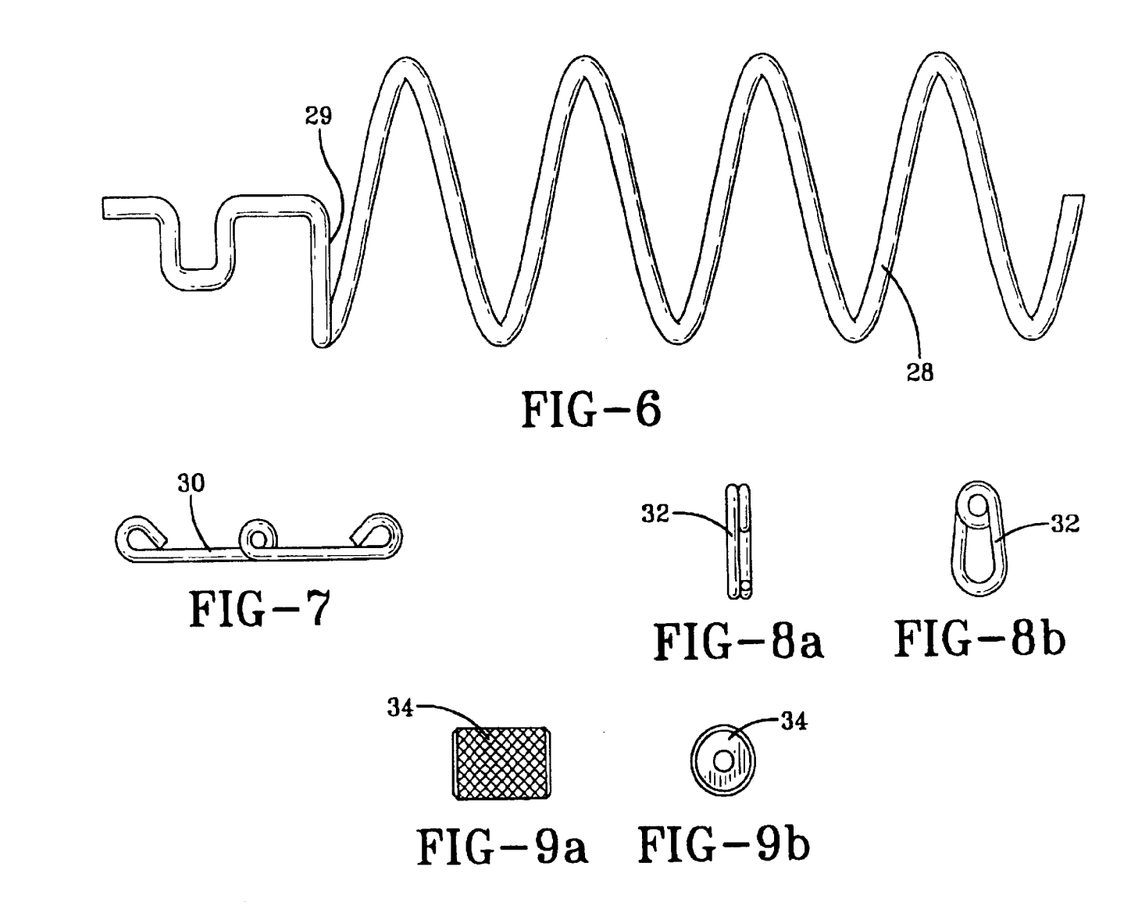
FIG. 6 is a side view of an embodiment of the coil of the present invention.
FIG. 7 is a side view of an embodiment of the drive link of the present invention.
FIGS. 8a and 8b are side and front views, respectively, of an embodiment of the guide loop of the present invention.
FIGS. 9a and 9b are side and front views, respectively, of an embodiment of the thumb wheel of the present invention.

FIG. 2 is a side view of an embodiment of the main shaft of the present invention. FIGS. 3a, 3b, and 3c are front, bottom, and side views, respectively, of an embodiment of the support channel of the present invention. FIGS. 4a and 4b are front and side views, respectively, of an embodiment of the handle of the present invention. FIG. 5 is a side view of an embodiment of the drive shaft of the present invention. FIG. 6 is a side view of an embodiment of the coil of the present invention. FIG. 7 is a side view of an embodiment of drive link of the present invention. FIGS. 8a and 8b are side and front views, respectively, of an embodiment the guide loop of the present invention. FIGS. 9a and 9b are side and front views, respectively, of an embodiment of the thumb wheel of the present invention.

Figure 10:
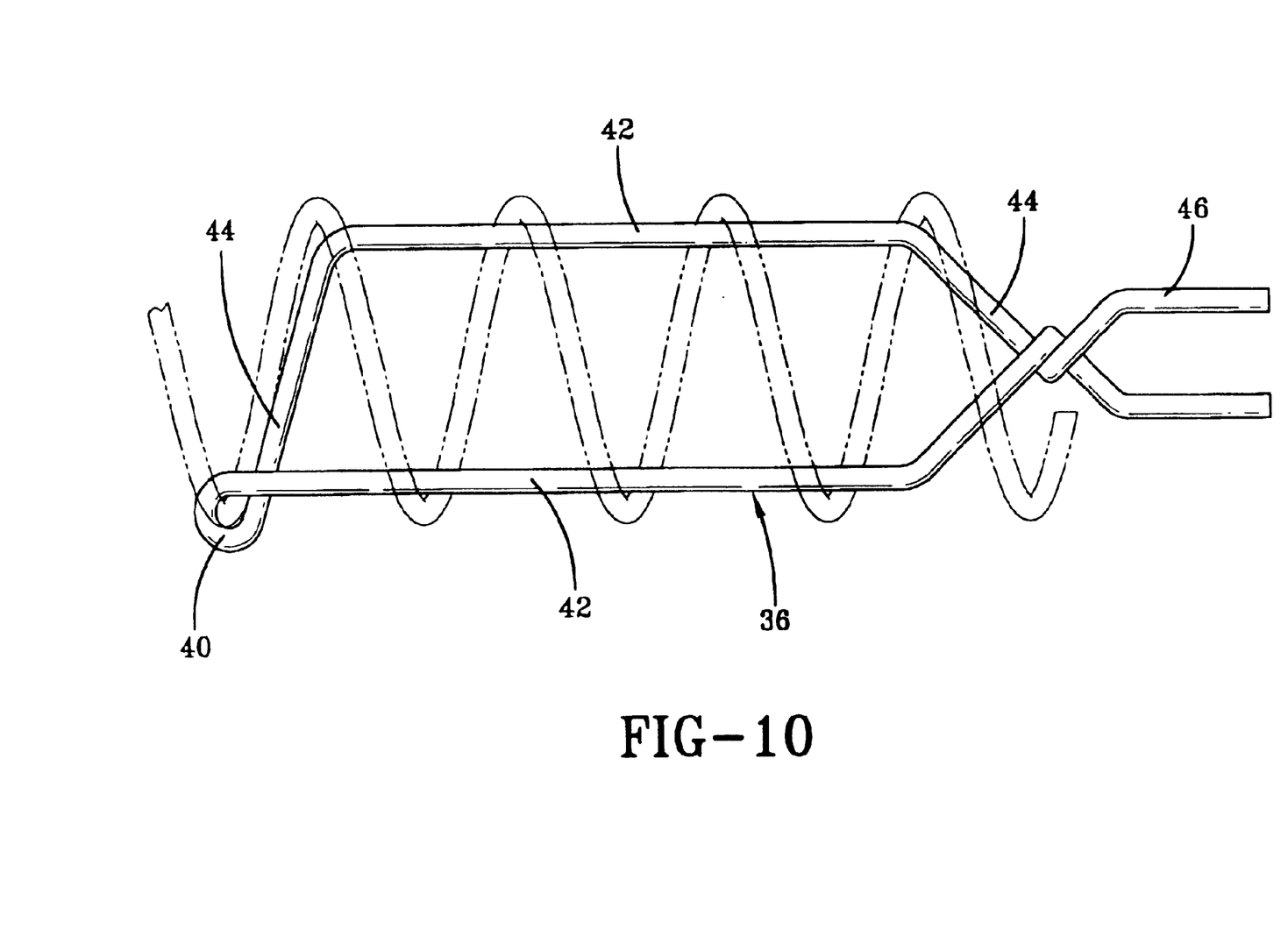
FIG. 10 is a side view of an optional embodiment of the holder of the present invention.

FIG. 10 is a side view of an optional embodiment of the holder 36 of the present invention. A feature of the holder 36 is the hoop 40 intended to threadably engage the spiral of the coil 28 of the present invention. In addition to the hoop 40, the holder 36 has two longitudinal portions 42 and two traverse portions 44 forming a perimeter into which smaller food items, such as marshmallows, may be placed into the holder 36 which is then secured in a coil 28 for cooking over an open heat source. In addition, the holder 36 may have an end portion 46 to facilitate the grasping of the holder 36. In this manner, the example embodiment allows for removal of the smaller food items from the coil 28 by rotating the holder 36 from its operable threaded engagement via the hoop 40 with the spiral of the coil 28.

As shown in the example embodiments, with the possible exception of the handle 24, a metal such as stainless steel is a preferred material for the construction of the present invention. Other metals, including alloys typically used for cooking food may also be used as a material for the construction of the present invention. Typically, the handle 24 will be made of a heat insulating or non-heat conductive material for the comfort of the user. Wood, plastic, and compositions thereof are usable as a handle 24 of the present invention, although typical heat dispersing designs such as a metal wire handle may be used.

The present invention is used as a food holding apparatus for cooking food over an open heat source. Typical foods for use with the present invention include hot dogs, wieners, sausages, bratwurst, and ears of corn. With the use of the holder 36 as described in the example embodiments, the present invention is adaptable for cooking other foods that may not readily be contained by a coil 28 such as marshmallows.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A rotary food holding apparatus for use in cooking said food, comprising:
    a main shaft;
    a support channel attached to a first end of said main shaft;
    a handle attached to a second end of said main shaft;
    a drive shaft having a first end operationally attached to said support channel and a second end operationally attached to said handle;
    at least two coils, each of said at least two coils having a first end operationally attached to said support channel; and
    one drive link operationally connected to said first end of said drive shaft and said first end of said each of said at least two coils,
    wherein a rotation of said drive shaft transmits a rotational force to said each of said at least two coils via said one drive link.

2. The rotary food cooking apparatus of claim 1 additionally comprising a guide loop attached to said main shaft between said first end and said second end of said main shaft, wherein said guide loop supports said drive shaft.

3. The rotary food cooking apparatus of claim 1 additionally comprising a thumb wheel attached to said drive shaft in the vicinity of said handle, wherein a rotation of said thumb wheel rotates said drive shaft.

4. The rotary food cooking apparatus of claim 1 additionally comprising a strap attached to said handle, wherein said strap defines a loop extending outwardly from said handle.

5. The rotary food cooking apparatus of claim 1 wherein said each of said at least two coils has a first clockwise spiral defining a first inner diameter.

6. The rotary food cooking apparatus of claim 5 wherein said each of said at least two coils has a second clockwise spiral defining a second inner diameter in the vicinity of said operational attachment of said each of said at least two coils to said support channel; and wherein said second inner diameter is less than said first inner diameter.

7. The rotary food cooking apparatus of claim 5 additionally comprising a food stop on said each of said at least two coils in the vicinity of said operational attachment of said each of said at least two coils to said support channel.

8. The rotary food cooking apparatus of claim 1 wherein said each of said at least two coils has a first counterclockwise spiral defining a first inner diameter and a second counterclockwise spiral at a second end of said each of said at least two coils defining a second inner diameter;
    wherein said second inner diameter is less than said first inner diameter; and
    wherein said second inner diameter is sufficiently sized to prevent a food from traversing through said second end of at least one coil.

9. The rotary food cooking apparatus of claim 1 additionally comprising a food stop at a second end of said each of said at least two coils,
    wherein said each of said at least two coils has a first counterclockwise spiral defining a first inner diameter; and
    wherein said food stop prevents a food from traversing through said second end of said each of said at least two coils.

10. The rotary food cooking apparatus of claim 1 wherein said apparatus, except for said handle, is made from a metal.

11. A rotary food cooking apparatus comprising:
    a main shaft;
    a support channel attached to a first end of said main shaft;
    a handle made from an insulating material attached to a second end of said main shaft;
    a drive shaft having a first end operationally attached to said support channel and a second end operationally attached to said handle;
    a thumb wheel attached to said drive shaft in the vicinity of said handle;
    a guide loop attached to said main shaft between said first end and said second end of said main shaft;
    at least two coils having a first end of each of said at least two coils operationally attached to said support channel;
    a food stop on said each of said at least two coils in the vicinity of said operational attachment of said each of said at least two coils to said support channel; and
    one drive link operationally connected to said first end of said drive shaft and said first end of said each of said at least two coils,
    wherein said main shaft and said drive shaft are substantially parallel;
    wherein said guide loop supports said drive shaft;
    wherein a rotation of said thumb wheel rotates said drive shaft;
    wherein a rotation of said drive shaft transmits a rotational force to said each of said at least two coils via said one drive link;
    wherein said each of said at least two coils has a first clockwise spiral defining a first inner diameter; and
    wherein said food stop prevents a food from traversing through said each of said at least two coils in the vicinity of said operational attachment of said each of said at least two coils to said support channel.

12. The rotary food cooking apparatus of claim 11 additionally comprising a strap fixably attached to said handle, wherein said strap defines a loop extending outwardly from said handle.

13. A rotary food holding apparatus for use in cooking said food, comprising;
    a main shaft;
    a support channel attached to a first end of said main shaft;
    a handle attached to a second end of said main shaft;
    a drive shaft having a first end operationally attached to said support channel and a second end operationally attached to said handle;
    at least one coil comprised of a first end; a second end; and a first spiral defining a first inner diameter, wherein said first end of said at least one coil is operationally attached to said support channel;
    a drive link operationally connected to said first end of said drive shaft and said first end of said at least one coil; and
    a holder made from a wire threadedly engaging said first spiral of said at least one coil with a hoop, said holder comprised of said hoop; a first longitudinal portion; a second longitudinal portion; at least two traverse portions connected between said first and second longitudinal portions; and an end portion, wherein a rotation of said drive shaft transmits a rotational force to said at least one coil via said drive link, wherein said first longitudinal portion and said second longitudinal portion are parallel to the to the longitudinal run of said at least one coil when said hoop is threadedly engaged to said first spiral; and wherein said end portion provides a means to grasp said holder during engagement of said holder and said first spiral.

14. The rotary food cooking apparatus of claim 13 additionally comprising a guide loop attached to said main shaft between said first end and said second end of said main shaft, wherein said guide loop supports said drive shaft.

15. The rotary food cooking apparatus of claim 13 additionally comprising a thumb wheel attached to said drive shaft in the vicinity of said handle, wherein a rotation of said thumb wheel rotates said drive shaft.

16. The rotary food cooking apparatus of claim 13 wherein said first spiral of said at least one coil is a first clockwise spiral defining said first inner diameter.

17. The rotary food cooking apparatus or claim 16 wherein said at least one coil has a second clockwise spiral defining a second inner diameter in the vicinity of said operational attachment of said at least one coil to said support channel; and wherein said second inner diameter is less than said first inner diameter.

18. The rotary food cooking apparatus of claim 16 additionally comprising a food stop on said at least one coil in the vicinity of said operational attachment of said at least one coil to said support channel.

19. The rotary food cooking apparatus of claim 13, wherein said at least one coil is further comprised of a second spiral at a second end of said at least one coil;

wherein said first spiral of said at least one coil is a counterclockwise spiral defining said first inner diameter;

wherein said second spiral is a counterclockwise spiral defining a second inner diameter;

wherein said second inner diameter is less than said first inner diameter; and wherein said second inner diameter is sufficiently sized to prevent a food from traversing through said second end of at least one coil.

20. The rotary food cooking apparatus of claim 13 additionally comprising a food stop at a second end of said at least one coil, wherein said first spiral of said at least one coil is a first counterclockwise spiral defining said first inner diameter; and wherein said food stop prevents a food from traversing through said second end of said at least one coil.

\* \* \* \* \*

UNITED STATES PATENT AND TRADEMARK OFFICE
CERTIFICATE OF CORRECTION

PATENT NO. : 6,701,827 B1
DATED : March 9, 2004
INVENTOR(S) : Longbrake

It is certified that error appears in the above-identified patent and that said Letters Patent is hereby corrected as shown below:

<u>Column 7,</u>
Line 25, please delete "or claim 16" and insert -- of claim 13 --.

<u>Column 8,</u>
Line 1, please delete "claim 16" and insert -- claim 13 --.

Signed and Sealed this

Fifteenth Day of June, 2004

JON W. DUDAS
*Acting Director of the United States Patent and Trademark Office*